United States Patent
Takatani et al.

(10) Patent No.: US 12,312,662 B2
(45) Date of Patent: May 27, 2025

(54) METHOD OF MANUFACTURING GRAIN-ORIENTED ELECTRICAL STEEL SHEET

(71) Applicant: NIPPON STEEL CORPORATION, Tokyo (JP)

(72) Inventors: Shinsuke Takatani, Tokyo (JP); Shunsuke Okumura, Tokyo (JP); Shohji Nagano, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 889 days.

(21) Appl. No.: 17/421,774

(22) PCT Filed: Jan. 16, 2020

(86) PCT No.: PCT/JP2020/001193
§ 371 (c)(1),
(2) Date: Jul. 9, 2021

(87) PCT Pub. No.: WO2020/149347
PCT Pub. Date: Jul. 23, 2020

(65) Prior Publication Data
US 2022/0090240 A1    Mar. 24, 2022

(30) Foreign Application Priority Data
Jan. 16, 2019    (JP) .................... 2019-005083

(51) Int. Cl.
*C22C 38/06*    (2006.01)
*C21D 8/02*    (2006.01)
(Continued)

(52) U.S. Cl.
CPC ............ *C22C 38/06* (2013.01); *C21D 8/0205* (2013.01); *C21D 8/0226* (2013.01);
(Continued)

(58) Field of Classification Search
None
See application file for complete search history.

(56) References Cited

U.S. PATENT DOCUMENTS

| 3,856,568 | A  | 12/1974 | Tanaka et al. |
| 2001/0030001 | A1 | 10/2001 | Hayakawa et al. |

(Continued)

FOREIGN PATENT DOCUMENTS

| EP | 3 385 397 A1 | 10/2018 |
| JP | 48-39338 A | 6/1973 |

(Continued)

OTHER PUBLICATIONS

"Test methods for electrical steel strip and sheet", JIS C 2550, 2011, total 122 pages.

*Primary Examiner* — Anthony M Liang
(74) *Attorney, Agent, or Firm* — Birch, Stewart, Kolasch & Birch, LLP

(57) ABSTRACT

A method of manufacturing a grain-oriented electrical steel sheet according to the present invention includes a process of executing hot rolling on a slab to obtain a hot-rolled sheet; a process of executing hot-rolled sheet annealing on the hot-rolled sheet to obtain an annealed hot-rolled sheet; a process of executing cold rolling on the annealed hot-rolled sheet to obtain a cold-rolled sheet; a process of executing decarburization annealing on the cold-rolled sheet to obtain a decarburization annealed sheet; a process of applying an annealing separator containing alumina as a main component to the decarburization annealed sheet; and a process of executing final annealing on the decarburization annealed sheet to which the annealing separator is applied, wherein the annealing separator contains 28% to 50% by mass of MgO, and wherein an application amount of the annealing separator is 6.0 to 14.0 g/m² per one surface of the decarburization annealed sheet.

2 Claims, 2 Drawing Sheets

(51) Int. Cl.
  *C21D 9/46* (2006.01)
  *C22C 38/00* (2006.01)
  *C22C 38/02* (2006.01)
  *C22C 38/04* (2006.01)
(52) U.S. Cl.
  CPC ............ *C21D 8/0236* (2013.01); *C21D 9/46* (2013.01); *C22C 38/001* (2013.01); *C22C 38/002* (2013.01); *C22C 38/02* (2013.01); *C22C 38/04* (2013.01)

(56) References Cited

U.S. PATENT DOCUMENTS

| | | | |
|---|---|---|---|
| 2002/0007870 A1* | 1/2002 | Ohata | C22C 38/02 148/111 |
| 2003/0188806 A1* | 10/2003 | Fujii | C21D 8/1283 148/112 |
| 2005/0217761 A1 | 10/2005 | Ushigami et al. | |

FOREIGN PATENT DOCUMENTS

| | | | |
|---|---|---|---|
| JP | 7-118750 A | | 5/1995 |
| JP | 7-278670 A | | 10/1995 |
| JP | 8-3648 A | | 1/1996 |
| JP | 11-106827 A | | 4/1999 |
| JP | 2000-38615 A | | 2/2000 |
| JP | 2000038615 A | * | 2/2000 |
| JP | 2003-268450 A | | 9/2003 |
| WO | WO 02/088403 A1 | | 11/2002 |

* cited by examiner

METHOD OF MANUFACTURING GRAIN-ORIENTED ELECTRICAL STEEL SHEET

TECHNICAL FIELD

The present invention relates to a method of manufacturing a grain-oriented electrical steel sheet having excellent magnetic characteristics suitable as an iron core material for a transformer.

Priority is claimed on Japanese Patent Application No. 2019-5083, filed Jan. 16, 2019, the content of which is incorporated herein by reference.

BACKGROUND ART

A grain-oriented electrical steel sheet is mainly used for a transformer. Since a transformer is continuously excited for a long period of time from installation to disposal and continues to generate an energy loss, the energy loss generated when the transformer is magnetized by an alternating current, that is, an iron loss is a main indicator for determining the performance of the transformer. Generally, a grain-oriented electrical steel sheet includes a base steel sheet that contains 7% by mass or less of Si and has a texture controlled such that an orientation of each grain matches a {110}<001> orientation referred to as Goss orientation and an insulation coating for imparting insulation to the base steel sheet.

Many methods have been proposed so far to reduce the iron loss of a grain-oriented electrical steel sheet. For example, a method of increasing alignment in the Goss direction in the texture of the base steel sheet, a method of increasing the amount of a solid solution element such as Si, which increases the electrical resistance, in the base steel sheet, a method of reducing the sheet thickness of the base steel sheet, and the like are known.

Further, it is known that application of tension to the base steel sheet is an effective method for reducing the iron loss. To apply tension to the base steel sheet, it is effective to form a coating made of a material having a thermal expansion coefficient smaller than that of the base steel sheet on a surface of the base steel sheet at a high temperature.

In a final annealing process of the base steel sheet, a forsterite coating generated by the reaction of an oxide present on the surface of the base steel sheet with an annealing separator can give tension to the base steel sheet. Since an unevenness is present at an interface between the forsterite coating and the base steel sheet, the forsterite coating also functions as an intermediate coating that enhances the adhesion between the insulating coating and the base steel sheet due to the anchor effect of the unevenness.

A method of forming an insulating coating by baking a coating liquid mainly composed of colloidal silica and phosphate, which is disclosed in Patent Document 1, has a significant effect of applying tension to the base steel sheet and is effective in reducing the iron loss. Therefore, a general method of manufacturing a grain-oriented electrical steel sheet is to execute insulation coating with phosphate as a main component in a state in which the forsterite coating occurring in the final annealing process remains. In the specification of the present application, an insulation film capable of applying tension as well as insulation properties to the base steel sheet is referred to as a tension-insulation coating.

On the other hand, in recent years, it has become clear that the forsterite coating inhibits the movement of a magnetic wall and adversely affects the iron loss. In a grain-oriented electrical steel sheet, a magnetic domain varies with the movement of the magnetic wall under an alternating magnetic field. The smooth movement of the magnetic wall is effective in reducing the iron loss, but the movement of the magnetic wall is hindered due to the presence of the unevenness at the interface between the forsterite coating and the base steel sheet, and as a result, it has been found that the iron loss reducing effect due to applying tension is canceled out and a sufficient iron loss reducing effect cannot be obtained.

Therefore, a technique for suppressing generation of a forsterite coating and smoothing the surface of the base steel sheet has been developed. For example, in Patent Documents 2 to 5, a technique for smoothing the surface of the base steel sheet without generating a forsterite coating in final annealing by controlling the dew point of the atmosphere of decarburization annealing and using alumina as the annealing separator is disclosed.

Further, in Patent Document 6, a technique for manufacturing a grain-oriented silicon steel sheet in which an inorganic mineral coating composed of forsterite and the like is not present on the surface of the base steel sheet using an annealing separator containing 5% by weight or more and 30% by weight or less of magnesia with respect to the total weight of alumina and the magnesia as the annealing separator is disclosed.

CITATION LIST

[Patent Document 1]
Japanese Unexamined Patent Application, First Publication No. S48-039338
[Patent Document 2]
Japanese Unexamined Patent Application, First Publication No. H07-278670
[Patent Document 3]
Japanese Unexamined Patent Application, First Publication No. H11-106827
[Patent Document 4]
Japanese Unexamined Patent Application, First Publication No. H07-118750
[Patent Document 5]
Japanese Unexamined Patent Application, First Publication No. 2003-268450
[Patent Document 6]
International Application Publication No. WO 2002-088403

SUMMARY OF THE INVENTION

Problems to be Solved by the Invention

Unless the forsterite coating is formed on the surface of the base steel sheet as in the above-mentioned related art, the unevenness that hinders the movement of the magnetic wall disappears from the surface of the base steel sheet, and thus it is considered that the iron loss of the grain-oriented electrical steel sheet can be improved. However, even with these techniques, the effect of improving the iron loss could not be sufficiently obtained.

The present invention is made in view of the above circumstances, and an object of the present invention is to reduce the iron loss of the grain-oriented electrical steel sheet in which a forsterite coating is not present between the base steel sheet and the tension-insulation coating as compared with in the related art.

Means for Solving the Problem

To solve the above problems, the present inventors have conducted a diligent study on a cause of not obtaining a sufficient effect of reducing the iron loss in a case in which a grain-oriented electrical steel sheet in which a forsterite coating is not present between the base steel sheet and the tension-insulation coating is manufactured. As a result, it was found that a large number of needle-like inclusions are present in a surface layer region of the base steel sheet in the grain-oriented electrical steel sheet in which a sufficient effect of reducing the iron loss was not obtained.

The present inventors postulate that these needle-like inclusions are a cause of movement of the magnetic wall being hindered, that is, a cause of the iron loss being adversely affected. As a result of further study by the present inventors, it was found that by controlling components and an application amount of the annealing separator under specific conditions, it is possible to suppress generation of the needle-like inclusions in the surface layer region of the base steel sheet, and it is possible to reduce the iron loss of the grain-oriented electrical steel sheet in which a forsterite coating is not present between the base steel sheet and the tension-insulation coating as compared with in the related art.

The present invention is made based on the above findings, and the gist thereof is as follows.
(1) A method of manufacturing a grain-oriented electrical steel sheet according to an aspect of the present invention includes a process of executing hot rolling on a slab to obtain a hot-rolled sheet; a process of executing hot-rolled sheet annealing on the hot-rolled sheet to obtain an annealed hot-rolled sheet; a process of executing cold rolling on the annealed hot-rolled sheet to obtain a cold-rolled sheet; a process of executing decarburization annealing on the cold-rolled sheet to obtain a decarburization annealed sheet; a process of applying an annealing separator containing alumina as a main component to the decarburization annealed sheet; and a process of executing final annealing on the decarburization annealed sheet to which the annealing separator is applied, wherein the annealing separator contains 28% to 50% by mass of MgO, and wherein an application amount of the annealing separator is 6.0 to 14.0 g/m² per one surface of the decarburization annealed sheet.
(2) In the method of manufacturing a grain-oriented electrical steel sheet according to (1), a BET specific surface area of the alumina may be 3.0 to 10.0 m²/g.
(3) In the method of manufacturing a grain-oriented electrical steel sheet according to (1) or (2), the slab may contain, as a chemical composition, in % by mass, C: 0.085% or less, Si: 0.80% to 7.00%, Mn: 0.05% to 1.00%, acid-soluble Al: 0.010% to 0.065%, S: 0.01% or less, N: 0.004% to 0.012%, B: 0.0005% to 0.0080%, P: 0% to 0.50%, Ni: 0% to 1.00%, Sn: 0% to 0.30%, Sb: 0% to 0.30%, Cu: 0% to 0.40%, Cr: 0% to 0.30%, Bi: 0% to 0.01%, and the remainder of Fe and impurities.

Effects of the Invention

According to the aspect of the present invention, it is possible to reduce the iron loss of the grain-oriented electrical steel sheet in which a forsterite coating is not present between the base steel sheet and the tension-insulation coating as compared with in the related art.

EMBODIMENT(S) FOR IMPLEMENTING THE INVENTION

Figure 1:
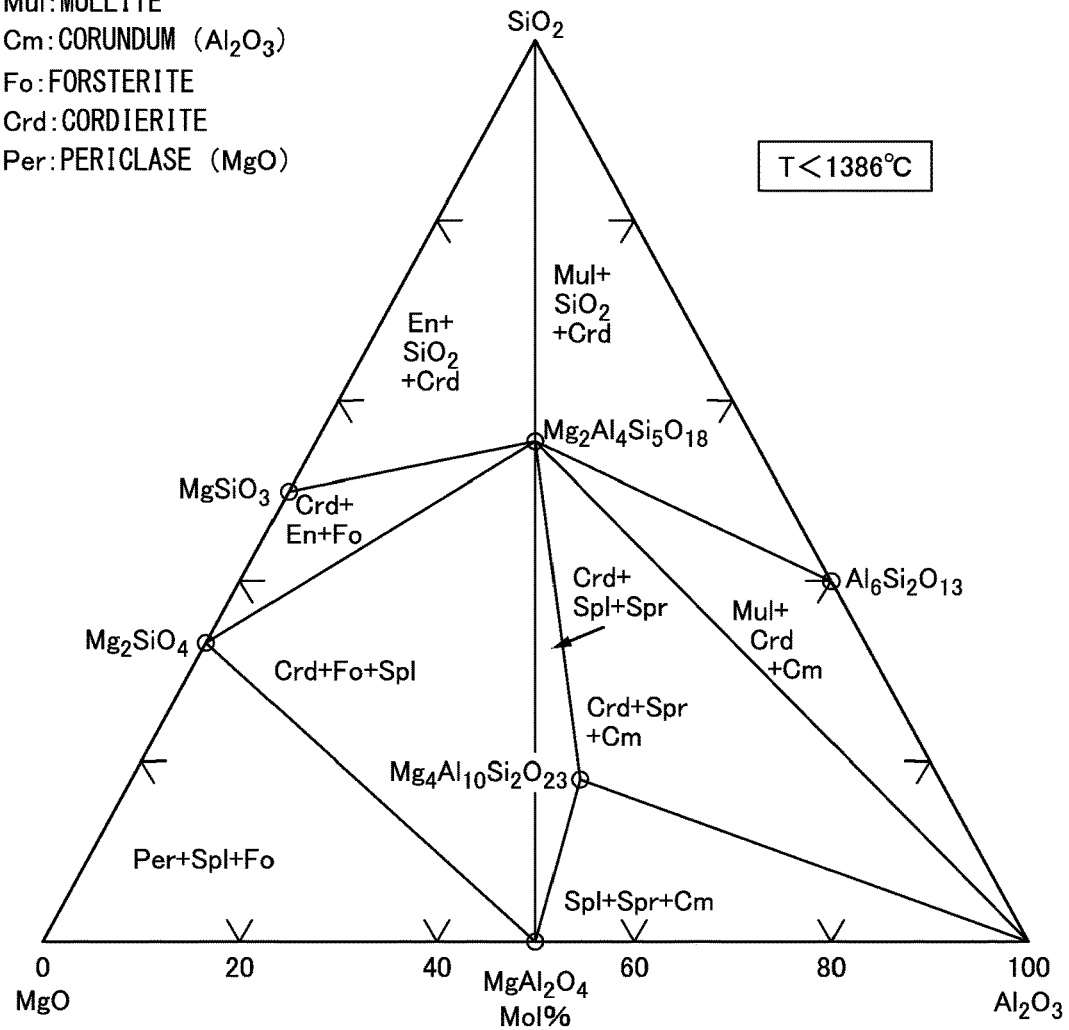
FIG. 1 is a ternary phase diagram of $Al_2O_3$—MgO—$SiO_2$.

A method of manufacturing a grain-oriented electrical steel sheet according to an embodiment of the present invention (hereinafter referred to as the present manufacturing method) includes a hot rolling process, a hot-rolled sheet annealing process, a cold rolling process, a decarburization annealing process, an annealing separator applying process, and a final annealing process.

The hot rolling process is a process of executing hot rolling on a slab having a predetermined chemical composition to obtain a hot-rolled sheet. The hot-rolled sheet annealing process is a process of executing hot-rolled sheet annealing on the hot-rolled sheet to obtain an annealed hot-rolled sheet. The cold rolling process is a process of executing cold rolling on the annealed hot-rolled sheet to obtain a cold-rolled sheet. The decarburization annealing process is a process of executing decarburization annealing on the cold-rolled sheet to obtain a decarburization annealed sheet. The annealing separator applying process is a process of applying an annealing separator containing alumina as a main component to the decarburization annealed sheet. The final annealing process is a process of executing final annealing on the decarburization annealed sheet to which the annealing separator is applied.

The details of each step will be described later, but the present manufacturing method, to suppress generation of needle-like inclusions in a surface layer region of a base steel sheet of the grain-oriented electrical steel sheet that is a final product, is characterized in that the following two manufacturing conditions are satisfied.
(Condition 1) The annealing separator containing alumina as a main component contains 28% to 50% by mass of MgO.
(Condition 2) An application amount of the annealing separator is 6.0 to 14.0 g/m² per one surface of the decarburization annealed sheet.

Hereinafter, the present manufacturing method will be described.

The present inventors postulate that one of the causes why an iron loss cannot be sufficiently reduced in a grain-oriented electrical steel sheet in which a forsterite coating is not present between a base steel sheet and a tension-insulation coating is the generation of inclusions that adversely affect magnetism during the final annealing. Therefore, the present inventors have taken a sample from a grain-oriented electrical steel sheet having a large iron loss (inferior) such that a cross section (a C cross section) orthogonal to a rolling direction of the base steel sheet is exposed and have observed the cross section of the sample with an optical microscope.

As a result, in a case of a grain-oriented electrical steel sheet having a large iron loss, it was found that a large number of needle-like inclusions are present in the surface layer region of the base steel sheet appearing in the C cross section, more specifically, a region having a length of 10 μm from a surface of the base steel sheet toward the inside of the base steel sheet in a sheet thickness direction of the base steel sheet. Furthermore, it was found that the needle-like inclusions were mullite ($3A_2O_3 \cdot 2SiO_2$). These observation results are the findings underlying the present invention.

In the manufacturing of the grain-oriented electrical steel sheet, the decarburization annealing is performed for the purpose of removing C (carbon) contained in the cold-rolled sheet before the final annealing. In the decarburization annealing, C contained in the cold-rolled sheet is removed, and at the same time, an oxide film of $SiO_2$ is formed on a surface of the cold-rolled sheet. A steel sheet obtained by such decarburization annealing, that is, a cold-rolled sheet in which C is removed, and an oxide film of $SiO_2$ is formed on a surface thereof is referred to as a decarburization annealed sheet. After the decarburization annealing, an annealing separator containing alumina as a main component is applied to the decarburization annealed sheet having an oxide film of $SiO_2$ for the purpose of preventing seizure of the decarburization annealed sheet wound in a coil shape during the final annealing. Then, the final annealing is performed on the decarburization annealed sheet to which the annealing separator is applied.

Since mullite is a composite oxide of alumina ($Al_2O_3$) and $SiO_2$, it is considered that the mullite is generated and remains because $SiO_2$ formed by the decarburization annealing is not sufficiently removed during the final annealing.

In the first place, $SiO_2$ formed by the decarburization annealing is adsorbed by alumina having a high BET specific surface area during the final annealing and $SiO_2$ is removed by the washing and removing of the annealing separator with water. Therefore, it is considered that insufficiency of the application amount of the annealing separator is a factor that $SiO_2$ formed by the decarburization annealing is not sufficiently removed.

That is, it is considered that there is a limit to the amount of $SiO_2$ that can be adsorbed per unit weight of alumina, the application amount of the annealing separator is insufficient, all of the $SiO_2$ is not adsorbed and removed, and $SiO_2$ remains on the surface of the steel sheet. As a result, it is considered that mullite is generated by the reaction of Al that has risen from the inside of the decarburization annealed sheet toward the surface of the steel sheet during the final annealing (Al generated due to the decomposition of AlN functioning as an inhibitor) with $SiO_2$ remaining on the surface of the decarburization annealed sheet and remains inside the decarburization annealed sheet (particularly, the surface layer region near the surface of the decarburization annealed sheet).

The present inventors have diligently examined the component composition and the application amount of the annealing separator for suppressing the generation of mullite based on the technical idea that the generation of mullite is suppressed by the adjustment of the component composition and the application amount of the annealing separator. As a result, it was found that it is possible to suppress the generation of mullite by adding MgO to the annealing separator containing alumina as a main component at a specific proportion and controlling the application amount of the annealing separator within a specific range.

FIG. 1 shows a ternary phase diagram of $Al_2O_3$ (alumina)-MgO—$SiO_2$. As shown in FIG. 1, theoretically, if MgO is present in a proportion of 50 mol % (28% by mass) or more with respect to alumina, mullite is not generated. Therefore, the present inventors have investigated the relationship between an addition amount of MgO to the annealing separator containing alumina as a main component and the number of pieces of mullite generated in the surface layer region of the base steel sheet (the steel sheet obtained after the final annealing of the decarburization annealed sheet).

The decarburization annealed sheet having a sheet thickness of 0.23 mm was used as a test material, and the annealing separator containing alumina as a main component was applied to the decarburization annealed sheet at an application amount of 8.0 $g/m^2$ per one surface while the addition amount of MgO is varied in the range of 0% to 80% by mass. After the annealing separator was dried, the final annealing was executed on the decarburization annealed sheet, and thus a grain-oriented electrical steel sheet in which the forsterite coating is not present on the surface of the base steel sheet (the steel sheet obtained after the final annealing was executed to the decarburization annealed sheet) was obtained. The final annealing was executed on the decarburization annealed sheet to which the annealing separator was applied in a state in which the decarburization annealed sheets were stacked.

After an excess annealing separator was removed from the grain-oriented electrical steel sheet obtained in such a manner by the washing with water, a 20 mm square test piece was taken, and a cross section (a C cross section) orthogonal to a rolling direction of the test piece was polished with a diamond buff. After that, the test piece was observed at a magnification of 1000 times using an optical microscope, and the number of needle-like inclusions each having a length of 1 μm or more which are present in a region (an observation region) having a length of 10 μm from the surface of the steel sheet toward the inside of the base steel sheet in the sheet thickness direction of the base steel sheet and a length of 20 mm in a sheet width direction of the base steel sheet was measured. The needle-like inclusion is defined as an inclusion in which the maximum major axis/maximum minor axis of the inclusion is 10 times or more.

Next, an iron loss $W_{17/50}$ of each of the test pieces having different levels in the amount of MgO in the annealing separator was measured. The average of the measured values at 10 points was taken as the iron loss $W_{17/50}$ of the test piece.

Figure 2:
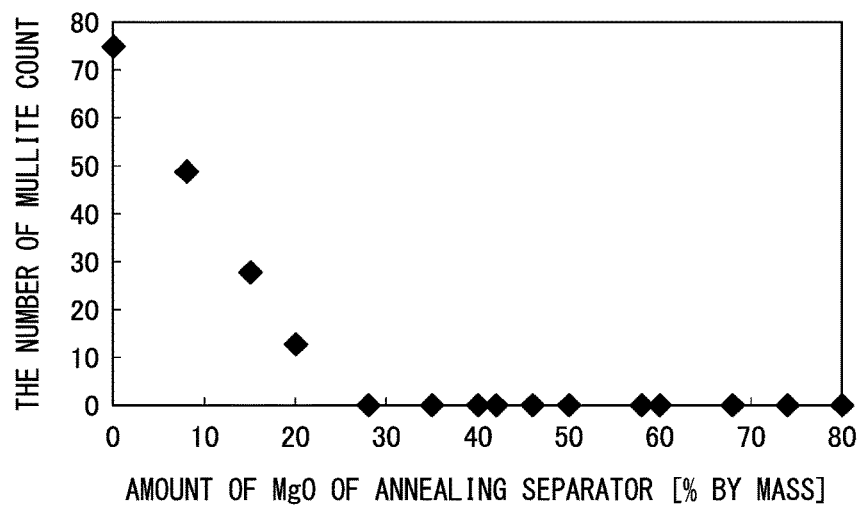
FIG. 2 is a diagram showing the relationship between the amount of MgO in an annealing separator and the number of pieces of mullite.
Figure 3:
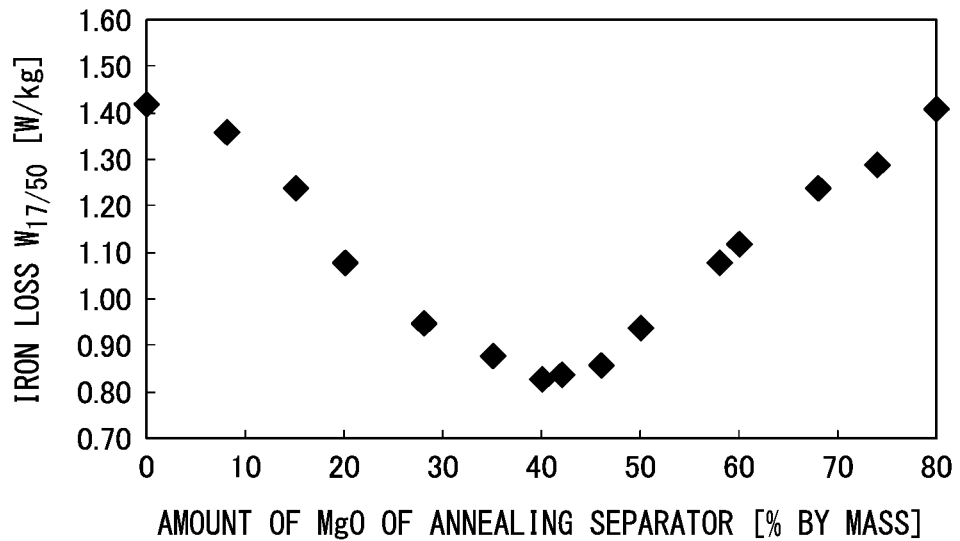
FIG. 3 is a diagram showing the relationship between the amount of MgO in an annealing separator and an iron loss ($W_{17/50}$).

The results of these measurements are shown in FIGS. 2 and 3. FIG. 2 is a diagram showing the relationship between the amount of MgO in the annealing separator and the number of pieces of mullite. FIG. 3 is a diagram showing the relationship between the amount of MgO in the annealing separator and the iron loss ($W_{17/50}$).

As shown in FIG. 2, when the amount of MgO in the annealing separator is 28% by mass or more, mullite is not generated. On the other hand, as shown in FIG. 3, it is understood that when the amount of MgO in the annealing separator is in the range of 28% by mass or more, the iron loss is less than 1.00 W/kg, and the effect of reducing the iron loss is obtained, however, when the amount of MgO in the annealing separator exceeds 50% by mass, the iron loss becomes 1.00 W/kg or more, which is inferior.

To clarify the cause, the surface of the obtained steel sheet was analyzed by XRD. As a result, it was confirmed that forsterite is detected at the level at which the amount of MgO is 54% by mass or more, and that the XRD peak height of forsterite increases as the amount of MgO increases. From this, it is considered that when the amount of MgO in the annealing separator exceeds 50% by mass, mullite is not generated (see FIG. 2), but on the other hand, forsterite is generated and the iron loss characteristics become inferior.

Next, the annealing separator containing alumina as a main component and 45% by mass of MgO was applied to the decarburization annealed sheet having a sheet thickness of 0.23 mm. The application amount of the annealing separator was varied in the range of 5.0 to 15.0 $g/m^2$ per one surface. A plurality of the decarburization annealed sheets to which the annealing separator is applied for drying were stacked and subjected to the final annealing to prepare grain-oriented electrical steel sheets.

After an excess annealing separator was removed from the grain-oriented electrical steel sheet obtained in such a manner by the washing with water, a 20 mm square test piece was taken, and a cross section (a C cross section) orthogonal to a rolling direction of the test piece was polished with a diamond buff. After that, the test piece was observed at a magnification of 1000 times using an optical microscope, and the number of needle-like inclusions each having a length of 1 μm or more which are present in a region (an observation region) having a length of 10 μm from the surface of the steel sheet toward the inside of the base steel sheet in the sheet thickness direction of the base steel sheet and a length of 20 mm in a sheet width direction of the base steel sheet was measured.

Figure 4:
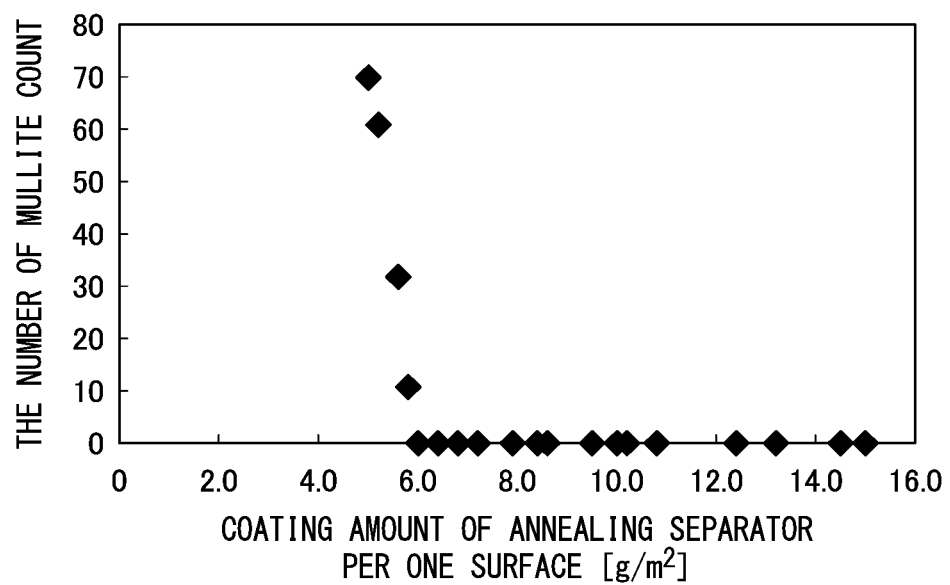
FIG. 4 is a diagram showing the relationship between an application amount of an annealing separator per one surface and the number of pieces of mullite.

The results are shown in FIG. 4. FIG. 4 is a diagram showing the relationship between the application amount of the annealing separator per one surface and the number of pieces of mullite. From FIG. 4, it is understood that when the application amount of the annealing separator per one surface is less than 6.0 $g/m^2$, "a needle-like inclusion (mullite) having a length of 1 μm or more" is generated.

According to the ternary phase diagram of $Al_2O_3$—MgO—$SiO_2$ shown in FIG. 1, when MgO is present in a proportion of 50 mol % (28% by mass) or more with respect to alumina, mullite is not generated, and thus in a case in which the addition amount of MgO is 45% by mass, mullite will not be generated. However, as shown in FIG. 4, when the application amount of the annealing separator containing 45% by mass of MgO per one surface is less than 6.0 $g/m^2$, "a needle-like inclusion (mullite) having a length of 1 μm or more" is generated. The reason for this can be considered as follows.

(x) When the application amount of the annealing separator is small, the adsorption and removal of $SiO_2$ by $Al_2O_3$ of the annealing separator become insufficient during the final annealing.

(y) During the final annealing, Al generated by the decomposition of AlN (an inhibitor) is added to the Al component of the annealing separator, the ratio of MgO in the annealing separator is relatively reduced, and the component composition of the annealing separator is shifted to a mullite generation region (see FIG. 1).

Therefore, it is important to sufficiently adsorb and remove $SiO_2$ with $Al_2O_3$ of the annealing separator during the final annealing in suppressing the generation of mullite, and for that purpose, it is necessary not only to control the addition amount of MgO in the annealing separator to 28% by mass or more but also to control the application amount of the annealing separator to 6.0 $g/m^2$ or more. When the application amount of the annealing separator exceeds 14.0 $g/m^2$, the application effect becomes saturated and the manufacturing cost increases, and thus the application amount of the annealing separator is set to 14.0 $g/m^2$ or less.

As described above, the present inventors have found that by controlling the addition amount of MgO in the annealing separator containing alumina as a main component and the application amount of the annealing separator to a specific range, it is possible to suppress the generation of the needle-like inclusions (mullite) in the surface layer region of the base steel sheet of the grain-oriented electrical steel sheet, and thus it is possible to realize the reduction of the iron loss of the grain-oriented electrical steel sheet.

Based on the above-mentioned study results by the present inventors, the present manufacturing method is characterized in that the following two manufacturing conditions are satisfied.

(Condition 1) The annealing separator containing alumina as a main component contains 28% to 50% by mass of MgO.
(Condition 2) An application amount of the annealing separator is 6.0 to 14.0 $g/m^2$ per one surface of the decarburization annealed sheet.

Hereinafter, the above-mentioned features (manufacturing conditions) of the present manufacturing method will be described.

<Amount of MgO of Annealing Separator: 28% to 50% by Mass>

As shown in FIG. 2, when the amount of MgO in the annealing separator is 28% by mass or more, mullite is not generated, and as shown in FIG. 3, the iron loss $W_{17/50}$ is less than 1.00 W/kg, which is superior. Therefore, the amount of MgO in the annealing separator is set to 28% by mass or more. It is preferably 32% by mass or more, and more preferably 35% by mass or more.

On the other hand, as shown in FIG. 3, when the amount of MgO in the annealing separator exceeds 50% by mass, the iron loss $W_{17/50}$ becomes 1.00 W/kg or more, which is inferior. Therefore, the amount of MgO in the annealing separator is set to 50% by mass or less. It is preferably 48% by mass or less, and more preferably 45% by mass or less.

<Adhesion Amount of Per Unit Area on One Surface after Application and Drying of Annealing Separator (Application Amount of Annealing Separator Per One Surface of Decarburization Annealed Sheet): 6.0 to 14.0 $g/m^2$>

As shown in FIG. 4, when the application amount of the annealing separator containing 45% by mass of MgO per one surface is less than 6.0 $g/m^2$, "a needle-like inclusion (mullite) having a length of 1 μm or more" is generated, and thus the adhesion amount of per unit area on one surface after application and drying of the annealing separator (the application amount of the annealing separator on one surface of the decarburization annealed sheet) is set to 6.0 $g/m^2$ or more. It is preferably 7.0 $g/m^2$ or more, and more preferably 8.0 $g/m^2$ or more.

On the other hand, when the application amount of the annealing separator exceeds 14.0 $g/m^2$, the application effect becomes saturated and the manufacturing cost increases, and thus the application amount of the annealing separator is set to 14.0 $g/m^2$ or less. It is preferably 13.0 $g/m^2$ or less, and more preferably 12.0 $g/m^2$ or less.

Next, basic processes of the present manufacturing method will be described.

Molten steel having a predetermined chemical composition is cast by a usual method to obtain a silicon steel slab. The chemical composition of the silicon steel slab is not limited to a specific composition as long as the magnetic characteristics and the mechanical characteristics required for the grain-oriented electrical steel sheet can be obtained, but an example of the chemical composition of the silicon steel slab is as follows. For example, the silicon steel slab contains, as a chemical composition, in % by mass, C: 0.085% or less, Si: 0.80% to 7.00%, Mn: 0.05% to 1.00%, acid-soluble Al: 0.010% to 0.065%, N: 0.004% to 0.012%, S: 0.01% or less, and B: 0.0005% to 0.0080%.

C: 0.085% or Less

C is an element effective for controlling a primary recrystallization structure, but it adversely affects the magnetic characteristics, and thus it is to be removed by the decarburization annealing before the final annealing. When the amount of C exceeds 0.085%, the decarburization annealing time becomes long and the productivity decreases, and thus the amount of C is set to 0.085% or less. The amount of C is preferably 0.070% or less, and more preferably 0.050% or less.

The lower limit of the amount of C includes 0%, but when the amount of C is reduced to less than 0.0001%, the manufacturing cost increases significantly, and thus 0.0001% is substantially the lower limit of the amount of C in the practical steel sheet. In the grain-oriented electrical steel sheet, the amount of C is usually reduced to about 0.001% or less by the decarburization annealing.

Si: 0.80% to 7.00%

Si is an element that increases the electrical resistance of the steel sheet and improves the iron loss characteristics. When the amount of Si is less than 0.80%, γ transformation occurs during the final annealing and the crystal orientation of the steel sheet is impaired, and thus the amount of Si is set to 0.80% or more. The amount of Si is preferably 1.50% or more, and more preferably 2.50% or more.

On the other hand, when the amount of Si exceeds 7.00%, the workability is lowered and cracks occur during rolling, and thus the amount of Si is set to 7.00% or less. The amount of Si is preferably 5.50% or less, and more preferably 4.50% or less.

Mn: 0.05% to 1.00%

Mn is an element that prevents cracking during hot rolling and combines with S and/or Se to form MnS that functions as an inhibitor. When the amount of Mn is less than 0.05%, the addition effect is not sufficiently exhibited, and thus the amount of Mn is set to 0.05% or more. The amount of Mn is preferably 0.07% or more, and more preferably 0.09% or more.

On the other hand, when the amount of Mn exceeds 1.00%, precipitation and dispersion of MnS become non-uniform, a required secondary recrystallization structure cannot be obtained, and a magnetic flux density decreases, and thus the amount of Mn is set to 1.00% or less. The amount of Mn is preferably 0.80% or less, and more preferably 0.06% or less.

Acid-Soluble Al: 0.010% to 0.065%

Acid-soluble Al is an element that combines with N to generate (Al, Si) N that functions as an inhibitor. When the amount of acid-soluble Al is less than 0.010%, the addition effect is not sufficiently exhibited and secondary recrystallization does not proceed sufficiently, and thus the amount of acid-soluble Al is set to 0.010% or more. The amount of acid-soluble Al is preferably 0.015% or more, and more preferably 0.020% or more.

On the other hand, when the amount of acid-soluble Al exceeds 0.065%, precipitation and dispersion of (Al, Si) N become non-uniform, a required secondary recrystallization structure cannot be obtained, and a magnetic flux density decreases, and thus the amount of soluble Al is set to 0.065% or less. The amount of acid-soluble Al is preferably 0.050% or less, and more preferably 0.040% or less.

N: 0.004% to 0.012%

N is an element that combines with Al to form AlN that functions as an inhibitor, but on the other hand, it is also an element that forms blisters (voids) in the steel sheet during the cold rolling. When the amount of N is less than 0.004%, the formation of AlN is insufficient, and thus the amount of N is set to 0.004% or more. The amount of N is preferably 0.006% or more, and more preferably 0.007% or more.

On the other hand, when the amount of N exceeds 0.012%, there is a concern that blisters (voids) may be generated in the steel sheet during the cold rolling, and thus the amount of N is set to 0.012% or less. The amount of N is preferably 0.010% or less, and more preferably 0.009% or less.

S: 0.01% or Less

S is an element that combines with Mn to form MnS that functions as an inhibitor.

When the amount of S exceeds 0.01%, precipitation and dispersion of MnS become non-uniform after purification, a desired secondary recrystallization structure cannot be obtained, a magnetic flux density decreases, and a hysteresis loss deteriorates, or MnS after purification remains, and the hysteresis loss deteriorates. The lower limit is not particularly set, but the amount of S is preferably 0.003% or more. The amount of S is more preferably 0.007% or more.

B: 0.0005% to 0.0080%

B is an element that combines with N and complex-precipitates with MnS to form BN that functions as an inhibitor.

When the amount of B is less than 0.0005%, the addition effect is not sufficiently exhibited, and thus the amount of B is set to 0.0005% or more. The amount of B is preferably 0.0010% or more, and more preferably 0.0015% or more. On the other hand, when the amount of B exceeds 0.0080%, precipitation and dispersion of BN become non-uniform, a required secondary recrystallization structure cannot be obtained, and a magnetic flux density decreases, and thus the amount of B is set to 0.0080% or less. The amount of B is preferably 0.0060% or less, and more preferably 0.0040% or less.

In the silicon steel slab, the remainder excluding the above elements is Fe and impurities. Impurities are elements that are inevitably mixed in from a steel raw material and/or in a steelmaking process and are acceptable elements as long as they do not impair the characteristics of the grain-oriented electrical steel sheet.

Further, the silicon steel slab may contain one or two or more of Cr: 0.30% or less, Cu: 0.40% or less, P: 0.50% or less, Ni: 1.00% or less, Sn: 0.30% or less, Sb: 0.30% or less, and Bi: 0.01% or less within a range in which the magnetic characteristics of the grain-oriented electrical steel sheet are not impaired and other characteristics can be enhanced. Since these elements do not have to be contained, the lower limit is 0.

In the hot rolling process, hot rolling is executed on a slab having the above chemical composition to obtain a hot-rolled sheet. Hot rolling conditions are not particularly limited, and ordinary conditions can be used. The hot-rolled sheet obtained by the hot rolling process is wound in a coil shape.

Before the slab is subjected to hot rolling, the slab may be heated to a temperature of more than 1300° C. to sufficiently make inhibitor components of MnS and AN into solid solution. Further, from the viewpoint of productivity and manufacturing cost, the slab may be heated to about 1250° C. on the premise that the inhibitor is enhanced by nitriding treatment in the subsequent step.

In the hot-rolled sheet annealing process, the hot-rolled sheet in a coil shape is rewound to a strip-shaped hot-rolled sheet, and then the hot-rolled sheet annealing is executed on the strip-shaped hot-rolled sheet to obtain an annealed hot-rolled sheet. Hot-rolled sheet annealing conditions are not particularly limited, and ordinary conditions can be used. In the cold rolling process, the cold rolling is executed on the annealed hot-rolled sheet once or twice or more to obtain a cold-rolled sheet having a final sheet thickness. In this cold rolling process, the cold rolling may be executed on the annealed hot-rolled sheet two or more times with intermediate annealing interposed therebetween to obtain a cold-rolled sheet. In the annealing performed before the final (last) cold rolling, homogenization of the crystal structure is performed. Cold rolling conditions are not particularly limited, and ordinary conditions can be used.

In the decarburization annealing process, the decarburization annealing is executed on the cold-rolled sheet to obtain a decarburization annealed sheet. In this decarburization annealing process, by heat-treatment of the cold-rolled sheet in wet hydrogen, the amount of C in the cold-rolled sheet is reduced to an amount that does not cause deterioration due to magnetic aging in a product steel sheet, and primary recrystallization occurs in the cold-rolled sheet to prepare for the next secondary recrystallization. Decarburization annealing conditions are not particularly limited, and ordinary conditions can be used. An oxide film of $SiO_2$ is formed on the surface of the decarburization annealed sheet obtained by such a decarburization annealing process. In a case in which a cold-rolled sheet is manufactured from a slab heated to about 1250° C., after the decarburization annealing, the decarburization annealed sheet is annealed in an ammonia atmosphere to generate AlN that functions as an inhibitor in the decarburization annealed sheet.

In the annealing separator applying process, an annealing separator containing alumina ($Al_2O_3$) as a main component is applied to the decarburization annealed sheet for the purpose of removing $SiO_2$ present on the surface of the decarburization annealed sheet and preventing seizure in the final annealing process. The annealing separator containing alumina as a main component contains 28% to 50% by mass of MgO, and the application amount of the annealing separator is 6.0 to 14.0 g/m² per one surface of the decarburization annealed sheet. The decarburization annealed sheet to which the annealing separator is applied is wound in a coil shape after the annealing separator is dried.

As described above, by controlling the amount (the addition amount) of MgO of the annealing separator containing alumina as a main component to 28% to 50% by mass, and by controlling the application amount of the annealing separator to 6.0 to 14.0 g/m² per one surface of the decarburization annealed sheet, it is possible to suppress the generation of the needle-like inclusions (mullite) in the surface layer region of the decarburization annealed sheet during the final annealing of the decarburization annealed sheet in the subsequent final annealing process. Further, as a result, it is possible to reduce the iron loss $W_{17/50}$ of a final product to a low value of less than 1.00 W/kg.

Further, to more effectively suppress the generation of the needle-like inclusions (mullite), preferably, the BET specific surface area of alumina, which is a main component of the annealing separator, is controlled to 3.0 to 10.0 m²/g. If the BET specific surface area of alumina is less than 3.0 m²/g, it is difficult to sufficiently adsorb and remove $SiO_2$, and thus the BET specific surface area of alumina is preferably 3.0 m²/g or more. It is more preferably 5.0 m²/g or more.

On the other hand, if the BET specific surface area of alumina exceeds 10.0 m²/g, the viscosity of aqueous slurry of the annealing separator increases, application spots are generated, and a portion where $SiO_2$ cannot be sufficiently adsorbed and removed occurs, and thus the BET specific surface area of alumina is preferably 10.0 m²/g or less. It is more preferably 8.0 m²/g or less.

In the final annealing process, a base steel sheet of a final product (a grain-oriented electrical steel sheet) is obtained by executing the final annealing on the decarburization annealed sheet in a coil shape to which the annealing separator is applied. In this final annealing process, secondary recrystallization occurs in the decarburization annealed sheet by performing the final annealing at a temperature of 1100° C. or higher. Final annealing conditions are not particularly limited, and ordinary conditions can be used. To reduce the hysteresis loss of the final product, purifying and annealing may be executed on the decarburization annealed sheet after the completion of the secondary recrystallization such that precipitate used as an inhibitor is detoxified.

Al moves from the inside of the decarburization annealed sheet toward the surface during the final annealing, but the amount of MgO of the annealing separator is controlled to 28% to 50% by mass, and the application amount of the annealing separator is controlled to 6.0 to 14.0 g/m² per one surface of the decarburization annealed sheet, and thus it is possible to prevent Al from reacting with $SiO_2$ remaining on the surface of the decarburization annealed sheet. Further, as a result, it is possible to suppress the generation of the needle-like inclusions (mullite) in the surface layer region of the decarburization annealed sheet during the final annealing. Further, since the amount of MgO of the annealing separator is limited to 50% by mass or less, it is possible to suppress the formation of a forsterite coating on the surface of the decarburization annealed sheet during the final annealing.

The needle-like inclusions (mullite) are not generated in the surface layer region of the base steel sheet (decarburization annealed sheet after the final annealing) obtained by the present manufacturing method as described above, and the forsterite coating is not present on the surface of the base steel sheet. That is, according to the present manufacturing method, it is possible to obtain a base steel sheet in which two factors that hinder the movement of the magnetic wall are eliminated. Therefore, in a case in which a grain-oriented electrical steel sheet in which a forsterite coating is not present between the base steel sheet and the tension-insulation coating is obtained as a final product by the formation of the tension-insulation coating on the surface of the base steel sheet after the final annealing process, it is possible to obtain a grain-oriented electrical steel sheet having a lower iron loss as compared with in the related art.

EXAMPLES

Next, examples of the present invention will be described, however, the conditions in the examples are one condition example employed for confirming the feasibility and effect of the present invention, and the present invention is not limited to this one condition example. In the present invention, various conditions can be employed as long as the gist of the present invention does not deviate and the object of the present invention is achieved.

Example 1

A slab having the composition shown in Table 1 was heated to 1100° C. and subjected to hot rolling to obtain a hot-rolled sheet having a sheet thickness of 2.60 mm, hot-rolled sheet annealing was executed on the hot-rolled sheet at 1100° C., and then the hot-rolled sheet was subjected to cold rolling a plurality of times with intermediate annealing interposed therebetween to be wound as a cold-rolled sheet having a final sheet thickness of 0.23 mm.

separator was applied to be dried, at 1200° C. for 20 hours. An excess annealing separator was removed from the base steel sheet obtained after the final annealing by the washing with water to obtain a base steel sheet of a grain-oriented electrical steel sheet that has no forsterite coating, has mirror gloss, and has completed secondary recrystallization.

TABLE 1

| | Chemical composition of steel slab (% by mass) | | | | | | |
|---|---|---|---|---|---|---|---|
| Steel No. | C | Si | Mn | Al | N | S | B |
| A1 | 0.085 | 3.45 | 0.10 | 0.028 | 0.0040 | 0.008 | 0.0015 |
| A2 | 0.031 | 1.21 | 0.10 | 0.029 | 0.0100 | 0.009 | 0.0020 |
| A3 | 0.033 | 6.52 | 0.10 | 0.029 | 0.0100 | 0.007 | 0.0018 |
| A4 | 0.041 | 3.45 | 0.08 | 0.028 | 0.0070 | 0.005 | 0.0019 |
| A5 | 0.044 | 3.33 | 0.80 | 0.029 | 0.0060 | 0.004 | 0.0021 |
| A6 | 0.052 | 4.52 | 0.12 | 0.020 | 0.0050 | 0.003 | 0.0016 |
| A7 | 0.055 | 3.12 | 0.09 | 0.055 | 0.0017 | 0.001 | 0.0017 |
| A8 | 0.061 | 2.81 | 0.09 | 0.030 | 0.0120 | 0.009 | 0.0018 |
| A9 | 0.062 | 3.12 | 0.11 | 0.030 | 0.0040 | 0.001 | 0.0019 |
| A10 | 0.071 | 2.92 | 0.13 | 0.030 | 0.0050 | 0.001 | 0.0021 |

The cold-rolled sheet was rewound, decarburization annealing was executed on the cold-rolled sheet at 820° C. in a moist atmosphere with 75% hydrogen, 25% nitrogen, and a dew point of 40° C., and then nitrification annealing was executed on a decarburization annealed sheet for the purpose of the formation of an inhibitor AlN in the decarburization annealed sheet. Then, aqueous slurry of an annealing separator containing alumina having a BET specific surface area of 3.0 to 10.0 $m^2/g$ as a main component and MgO in an amount of 0% to 80% by mass was applied to a surface of the decarburization annealed sheet while the application amount per one surface is changed in the range of 5.0 to 15.0 $g/m^2$, and the decarburization annealed sheet was wound in a coil shape.

Final annealing was executed on the decarburization annealed sheet in a coil shape, to which the above annealing A test piece having a 20 mm square was taken from the central portion in a width direction of the outermost circumference of the grain-oriented electrical steel sheet (base steel sheet) in a coil shape obtained in such a manner. A cross section (a C cross section) orthogonal to a rolling direction of the test piece was polished with a diamond buff. A cross section of one side (20 mm) of the test piece was observed with an optical microscope (1000 times), and the number of needle-like inclusions each having a length of 1 μm or more present in an observation region having a sheet thickness direction length of 10 μm and a sheet width direction length of 20 mm was measured. Further, the iron loss $W_{17/50}$ of the test piece was measured according to JIS C 2550. The results are shown in Table 2.

TABLE 2

| | No. | Steel No. | Annealing separator | | Needle-like inclusion of 1 μm or more (nmber/ 20 mm) | Iron loss $W_{17/50}$ (W/kg) | Presence or absence of forsterite |
|---|---|---|---|---|---|---|---|
| | | | Amount of MgO (% by mass) | Application amount ($g/m^2$) | | | |
| Invention Example | B1 | A1 | 28 | 6.0 | 0 | 0.98 | Absence |
| | B2 | A2 | 32 | 6.4 | 0 | 0.89 | Absence |
| | B3 | A3 | 34 | 7.1 | 0 | 0.87 | Absence |
| | B4 | A4 | 35 | 7.8 | 0 | 0.85 | Absence |
| | B5 | A5 | 36 | 8.2 | 0 | 0.84 | Absence |
| | B6 | A6 | 38 | 9.0 | 0 | 0.83 | Absence |
| | B7 | A7 | 40 | 9.5 | 0 | 0.81 | Absence |
| | B8 | A8 | 45 | 10.8 | 0 | 0.82 | Absence |
| | B9 | A9 | 48 | 11.1 | 0 | 0.84 | Absence |
| | B10 | A10 | 50 | 12.0 | 0 | 0.82 | Absence |
| Comparative Example | b1 | A3 | 0 | 10.0 | 54 | 1.43 | Absence |
| | b2 | A3 | 12 | 10.0 | 38 | 1.20 | Absence |
| | b3 | A3 | 22 | 10.0 | 2 | 1.24 | Absence |
| | b4 | A3 | 60 | 10.0 | 0 | 1.21 | Presence |
| | b5 | A3 | 80 | 10.0 | 0 | 1.48 | Presence |
| | b6 | A3 | 28 | 5 | 49 | 1.24 | Absence |
| | b7 | A3 | 32 | 4.2 | 42 | 1.19 | Absence |
| | b8 | A3 | 34 | 4.5 | 38 | 1.17 | Absence |
| | b9 | A3 | 35 | 4.8 | 14 | 1.14 | Absence |
| | b10 | A3 | 36 | 4.9 | 10 | 1.01 | Absence |
| | b11 | A3 | 38 | 5.1 | 20 | 1.11 | Absence |
| | b12 | A3 | 40 | 5 | 12 | 1.08 | Absence |

TABLE 2-continued

| No. | No. | Steel No. | Annealing separator Amount of MgO (% by mass) | Annealing separator Application amount (g/m²) | Needle-like inclusion of 1 μm or more (nmber/ 20 mm) | Iron loss $W_{17/50}$ (W/kg) | Presence or absence of forsterite |
|---|---|---|---|---|---|---|---|
| | b13 | A3 | 45 | 5.1 | 39 | 1.21 | Absence |
| | b14 | A3 | 48 | 4.9 | 58 | 1.32 | Absence |
| | b15 | A3 | 50 | 5.2 | 41 | 1.24 | Absence |

As shown in Table 2, in Invention Examples B1 to B10, the amount of MgO of the annealing separator is controlled in the range of 28% by mass to 50% by mass, and the application amount of the annealing separator is controlled in the range of 6.0 to 14.0 g/m² per one surface, and as a result, the needle-like inclusions (mullite) each having a length of 1 μm or more are not present in the observation area of the base steel sheet, and the iron loss $W_{17/50}$ was suppressed to less than 1.00 W/kg.

As shown in Table 2, in Comparative Examples b1 to b3, the application amount of the annealing separator is controlled in the range of 6.0 to 14.0 g/m² per one surface, but the amount of MgO of the annealing separator is less than 28% by mass, and thus a plurality of needle-like inclusions (mullite) each having a length of 1 μm or more are present in the observation region of the base steel sheet, and the iron loss $W_{17/50}$ increased to more than 1.00 W/kg.

In Comparative Examples b4 and b5, the application amount of the annealing separator is controlled in the range of 6.0 to 14.0 g/m² per one surface, but the amount of MgO of the annealing separator is more than 50% by mass. In this case, the needle-like inclusions (mullite) each having a length of 1 μm or more are not present in the observation region of the base steel sheet, but forsterite is generated, and as a result, the iron loss $W_{17/50}$ increased to more than 1.00 W/kg.

In Comparative Example b6, the amount of MgO of the annealing separator is 28% by mass or more, but the application amount of the annealing separator is less than 6.0 g/m² per one surface, and thus a plurality of needle-like inclusions (mullite) each having a length of 1 μm or more are present in the observation region of the base steel sheet, and the iron loss $W_{17/50}$ increased to more than 1.00 W/kg.

In Comparative Examples b7 to b15, the amount of MgO of the annealing separator is controlled in the range of 28% by mass to 50% by mass, but the application amount of the annealing separator is less than 6.0 g/m² per one surface, and thus a plurality of needle-like inclusions (mullite) each having a length of 1 μm or more are present in the observation region of the base steel sheet, and the iron loss $W_{17/50}$ increased to more than 1.00 W/kg.

Example 2

A slab having the composition of Steel No. A5 shown in Table 1 was heated to 1100° C. and subjected to hot rolling to obtain a hot-rolled sheet having a sheet thickness of 2.60 mm, hot-rolled sheet annealing was executed on the hot-rolled sheet at 1100° C., and then the hot-rolled sheet was subjected to cold rolling a plurality of times with intermediate annealing interposed therebetween to be wound as a cold-rolled sheet having a final sheet thickness of 0.23 mm.

The cold-rolled sheet was rewound, decarburization annealing was executed on the cold-rolled sheet at 820° C. in a moist atmosphere with 75% hydrogen, 25% nitrogen, and a dew point of 40° C., and then nitrification annealing was executed on a decarburization annealed sheet for the purpose of the formation of an inhibitor Al in the decarburization annealed sheet.

Then, aqueous slurry of an annealing separator containing alumina having a BET specific surface area changed in the range of 3.0 to 10.0 m²/g as a main component and MgO in an amount of 35% to 48% by mass was applied to a surface of the decarburization annealed sheet while the application amount per one surface is changed in the range of 8.2 to 11.2 g/m², and the decarburization annealed sheet was wound in a coil shape.

Final annealing was executed on the decarburization annealed sheet in a coil shape, to which the above annealing separator was applied to be dried, at 1200° C. for 20 hours. An excess annealing separator was removed from the base steel sheet obtained after the final annealing by the washing with water to obtain a base steel sheet of a grain-oriented electrical steel sheet that has no forsterite coating, has mirror gloss, and has completed secondary recrystallization.

A test piece having a 20 mm square was taken from the central portion in a width direction of the outermost circumference of the grain-oriented electrical steel sheet (base steel sheet) in a coil shape obtained in such a manner A cross section (a C cross section) orthogonal to a rolling direction of the test piece was polished with a diamond buff. A cross section of one side (20 mm) of the test piece was observed with an optical microscope (1000 times), and the number of needle-like inclusions each having a length of 1 μm or more present in an observation region having a sheet thickness direction length of 10 μm and a sheet width direction length of 20 mm was measured. Further, the iron loss $W_{17/50}$ of the test piece was measured according to JIS C 2550. The results are shown in Table 3.

TABLE 3

| No. | No. | Steel No. | Annealing separator | | BET specific surface area of alumina ($m^2/g$) | Needle-like inclusion of 1 μm or more (number/20 mm) | Iron loss $W_{17/50}$ (W/kg) | Presence or absence of forsterite |
|---|---|---|---|---|---|---|---|---|
| | | | Amount of MgO (% by mass) | Application amount ($g/m^2$) | | | | |
| Invention Example | C1 | A5 | 35 | 8.2 | 3.0 | 0 | 0.88 | Absence |
| | C2 | A5 | 38 | 9.8 | 4.8 | 0 | 0.84 | Absence |
| | C3 | A5 | 42 | 10.1 | 6.2 | 0 | 0.80 | Absence |
| | C4 | A5 | 45 | 10.8 | 7.5 | 0 | 0.77 | Absence |
| | C5 | A5 | 48 | 11.2 | 10.0 | 0 | 0.72 | Absence |

As shown in Table 3, it is understood that it is possible to significantly reduce the iron loss $W_{17/50}$ by controlling the amount of MgO of the annealing separator in the range of 28% by mass to 50% by mass, by controlling the application amount of the annealing separator in the range of 6.0 to 14.0 $g/m^2$ per one surface, and by controlling the BET specific surface area of alumina, which is a main component of the annealing separator, to 3.0 to 10.0 $m^2/g$. It is considered that this is because the needle-like inclusions are not generated and the amount of $SiO_2$ adsorbed by alumina increases.

INDUSTRIAL APPLICABILITY

According to the present invention, it is possible to reduce the iron loss of the grain-oriented electrical steel sheet in which the forsterite coating is not present between the base steel sheet and the tension-insulation coating as compared with in the related art. Therefore, the present invention is highly applicable in the electrical steel sheet manufacturing industry and the electrical steel sheet utilization industry.

The invention claimed is:
1. A method of manufacturing a grain-oriented electrical steel sheet comprising:
   a process of executing hot rolling on a slab to obtain a hot-rolled sheet;
   a process of executing hot-rolled sheet annealing on the hot-rolled sheet to obtain an annealed hot-rolled sheet;
   a process of executing cold rolling on the annealed hot-rolled sheet to obtain a cold-rolled sheet;
   a process of executing decarburization annealing on the cold-rolled sheet to obtain a decarburization annealed sheet;
   a process of applying an annealing separator containing alumina as a main component to the decarburization annealed sheet; and
   a process of executing final annealing on the decarburization annealed sheet to which the annealing separator is applied,
   wherein the annealing separator consists of MgO and the alumina,
   wherein the annealing separator contains 28% to 50% by mass of the MgO,
   wherein an application amount of the annealing separator is 6.0 to 14.0 $g/m^2$ per one surface of the decarburization annealed sheet, and
   wherein a BET specific surface area of the alumina is 3.0 to 10.0 $m^2/g$.

2. The method of manufacturing a grain-oriented electrical steel sheet according to claim 1,
   wherein the slab contains, as a chemical composition, in % by mass,
   C: 0.085% or less,
   Si: 0.80% to 7.00%,
   Mn: 0.05% to 1.00%,
   acid-soluble Al: 0.010% to 0.065%,
   S: 0.01% or less,
   N: 0.004% to 0.012%,
   B: 0.0005% to 0.0080%,
   P: 0% to 0.50%,
   Ni: 0% to 1.00%,
   Sn: 0% to 0.30%,
   Sb: 0% to 0.30%,
   Cu: 0% to 0.40%,
   Cr: 0% to 0.30%,
   Bi: 0% to 0.01%, and
   a remainder of Fe and impurities.

\* \* \* \* \*